United States Patent [19]
Agarwal

[11] Patent Number: 5,802,061
[45] Date of Patent: Sep. 1, 1998

[54] METHOD AND APPARATUS FOR NETWORK ACCESS CONTROL WITH IMPLICIT RANGING AND DYNAMICALLY ASSIGNED TIME SLOTS

[75] Inventor: Rajeev Agarwal, Dover, N.H.

[73] Assignee: Cabletron Systems, Inc., Rochester, N.H.

[21] Appl. No.: 545,501

[22] Filed: Oct. 19, 1995

[51] Int. Cl.$^6$ ............................................. H04J 3/02
[52] U.S. Cl. ..................... 370/461; 370/458; 370/503; 370/406
[58] Field of Search ..................... 370/447, 203, 370/461, 462, 438, 431, 321, 444–451, 458, 459, 460, 503, 254, 256, 257, 258, 337, 402–408, 425, 347, 350, 401, 424, 442, 452, 466, 498; 455/13.1, 132.2; 340/825.01, 825.02, 825.03; 375/355, 356

[56] References Cited

U.S. PATENT DOCUMENTS

| | | | |
|---|---|---|---|
| 4,631,718 | 12/1986 | Miyao | 370/425 |
| 4,656,627 | 4/1987 | Hasley | 370/438 |
| 4,845,735 | 7/1989 | Payne et al. | 379/5 |
| 5,077,791 | 12/1991 | Salihi | 380/23 |
| 5,124,980 | 6/1992 | Maki | 370/498 |
| 5,453,987 | 9/1995 | Tran | 370/447 |

FOREIGN PATENT DOCUMENTS

| | | |
|---|---|---|
| A2 0 088 647 | 9/1983 | European Pat. Off. . |
| A2 0 168 051 | 1/1986 | European Pat. Off. . |
| A2 0 242 142 | 10/1987 | European Pat. Off. . |

*Primary Examiner*—Dang Ton
*Attorney, Agent, or Firm*—Wolf, Greenfield & Sacks, P.C.

[57] ABSTRACT

A time division multiple access protocol that prevents data collisions and that maximizes bandwidth utilization in a long distance communications network by performing implicit ranging and dynamic assignment of time slots. The propagation delay that would result when data travels from an end station to the hub is determined using an implicit ranging method. Time slots in a synchronization signal are assigned to end stations based upon the requests from end stations and the availability of time slots. Each end station is notified of its assigned time slot(s) and propagation delay and is provided with a timing signal which is the synchronization signal delayed by its propagation delay. Each end station then starts to transmit its data at the beginning of a time duration that is twice its propagation delay before the start of its assigned time slot(s) in its timing signal. Each end station transmits its data for the duration of its assigned time slot(s). The data from each of these end stations travels in a pipe-lined manner through the link toward the hub and arrives at the hub during the assigned time slots in the synchronization signal. Each time slot preferably includes a guard band during which no data is transmitted; the duration of the guard band can be minimized thus resulting in more efficient bandwidth utilization.

23 Claims, 8 Drawing Sheets

METHOD AND APPARATUS FOR NETWORK ACCESS CONTROL WITH IMPLICIT RANGING AND DYNAMICALLY ASSIGNED TIME SLOTS

FIELD OF THE INVENTION

The present invention relates to network access control, and more particularly to a time division multiple access protocol which maximizes bandwidth utilization in long distance communications networks by using implicit ranging and dynamically assigned time slots.

BACKGROUND OF THE INVENTION

A media access control protocol may be viewed as a set of rules that are followed when an end station attempts to send data on a network interconnecting multiple end stations. The protocol typically attempts to prevent and/or minimize collisions between data on the network and to maximize bandwidth utilization.

A time division multiple access (TDMA) protocol assigns time periods to end stations; an end station can send data only during its assigned time period so that collisions can be prevented. In conventional TDMA protocols, large guard bands are required between transmissions from different end stations. A guard band is a reserved time period during which no end station can initiate transmission. Larger guard bands are necessary to prevent data collisions in networks with longer distances between end stations, resulting in a reduced throughput.

Two other known media access protocols are Carrier Sense Multiple Access with Collision Detection (CSMA/CD) and token passing. However, as explained below, these other protocols are impractical for preventing/minimizing collisions and optimizing bandwidth when the network has long links and the distance between consecutive or nonconsecutive end stations is greater than thousands of meters.

In the CSMA/CD protocol, an end station with data to send must first determine if the network is free. If any other end station is already sending data, the end station wishing to send data must wait until the other station is finished and the network becomes idle.

In the CSMA/CD protocol, two stations may wish to send data and determine at the same time that the link is idle. In that case, a data collision would occur when the two stations send their data simultaneously. Upon detection of a collision, the CSMA/CD protocol requires the two stations to attempt resending data after each of the two stations waits a random period of time. The requirement of waiting a random period of time minimizes the recurrence of a data collision.

In the CSMA/CD protocol, a data collision can occur in another situation. Referring to FIG. 1, assume that end station 12 is currently using link 10 of communications network 20 to transmit data, and that end stations 14 and 18 each have data to send over the link. The first data sent by end station 12 takes longer to reach end station 18 than end station 14. Thus, end station 14 may determine that the link is free before the first data reaches end station 18, and end station 14 would begin to send its data. Because of a finite delay in second data sent by end station 14 reaching end station 18, end station 18 assumes that the link is idle when the first data sent by end station 12 has reached end station 18 and during the finite delay. If end station 18 then sends its data during the finite delay, a collision would result between the third data sent by end station 18 and the second data sent by end station 14. In this situation, the probability of a collision depends on the duration of the finite delay. The finite delay depends on the propagation delay of signals through the medium of link 10, and on the distance between the two competing end stations, 14 and 18 in this example.

Thus, in the CSMA/CD protocol, the probability of a collision is dependent on the distance between end stations. In long distance communications networks having links with end stations that are thousands of meters apart, the finite delay and thus the probability for collisions can become high.

Moreover, in the CSMA/CD protocol, when the distance of data travel is high, the time that an end station must wait for the channel to become idle can be high. Thus, the amount of data sent during a finite time period is lower with longer links in networks using the CSMA/CD protocol.

In a token-passing protocol, a token is generated during an initialization phase of the communications network. The token travels around the network, and an end station having data to send must seize a free token before sending its data. When the token is in use by one end station, the other end stations cannot send any data. Thus, in the token-passing protocol as well, long links between consecutive or nonconsecutive end stations leads to less data being sent since the longer distances result in longer time periods before the token becomes free.

Thus, the conventional prior art protocols are not efficient for preventing/minimizing collisions and/or maximizing bandwidth utilization in long distance communications networks. These long distance networks are becoming more prevalent; an example is a cable television system with end stations separated by thousands of meters. Thus, there is an ongoing need to provide such features in a long distance communications networks.

SUMMARY OF THE INVENTION

The present invention is directed to a network access control protocol that prevents collisions and/or optimizes bandwidth in long distance communications networks. In one general aspect, the invention features a time division multiple access (TDMA) protocol that assigns time slots to end stations having data to send to a hub, the time slots being dynamically assigned upon requests from the end stations.

In another general aspect, an implicit ranging method determines a propagation delay for an end station when the end station transmits a slot request message to the hub. The propagation delay measurement is sometimes referred to as "ranging." Rather than using an explicit ranging signal, the propagation delay is determined from the slot request message. Thus, the ranging function is "implicit" in that no explicit ranging signal is required.

In a further general aspect, the end stations send their data according to their respective assigned time slots. As a result, data from the end stations can be sent to the hub in a pipe-lined manner through the network, and the hub receives the data from each respective end station during the end station's assigned time slot. Because data travels through the communications network in a pipe-lined manner, a longer communications network can carry more data. In addition, pipe-lined transmission in the TDMA protocol with dynamically assigned time slots minimizes the duration of guard bands. Thus, the protocol of the present invention optimizes bandwidth utilization in long distance communications networks.

These and other features of the present invention will be more particularly described with respect to the following drawings and detailed description.

DETAILED DESCRIPTION

Figure 1:
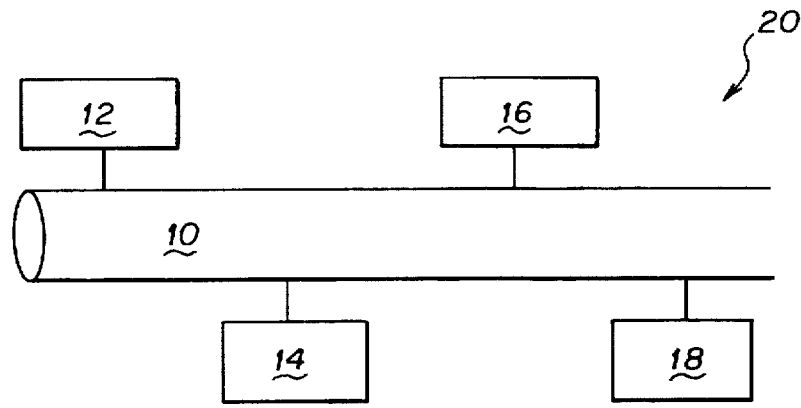
FIG. 1 is a schematic diagram of a communications link operatively connected to multiple end stations.
Figure 2:
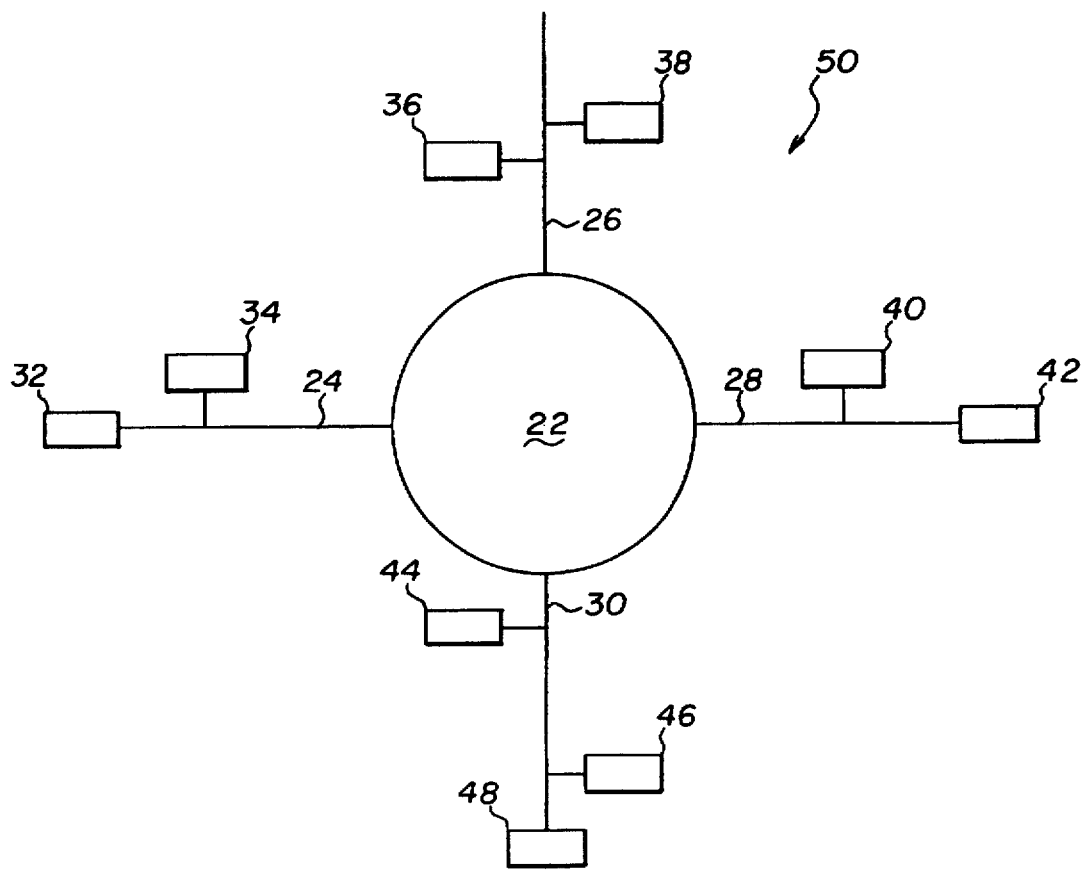
FIG. 2 is a schematic diagram of a star-based communications network having a hub and multiple end stations.

FIG. 2 shows a network 50 based on a star topology and serving long distance communications. The network comprises a central hub 22, having four links 24, 26, 28, and 30. The hub can be a bridge, a router, or a switch which receives data sent by the end stations to the hub, e.g., the MMAC or MMAC Plus hub sold by Cabletron Systems, Inc., Rochester, N.H. The end stations can be any general purpose computer terminal or communications device. More specifically, link 24 operatively connects end stations 32 and 34 to the hub, link 26 operatively connects end stations 36 and 38 to the hub, link 28 operatively connects end stations 40 and 42 to the hub, and link 30 operatively connects end stations 44, 46, and 48 to the hub.

Each link in the network 50 may be a long distance link, and the physical distance between an end station and the hub and/or between consecutive or nonconsecutive end stations on a link can be thousands of meters. An example of a network based on the topology of FIG. 2 is a cable television system that can be used to distribute television signals from one central hub to many distant users; in the cable television system, the end stations are known as customer premises equipment (CPE).

Generally, at least part of the link is a coaxial cable for ease of connection to end stations; however, all or part of the link may be another type of communications medium, e.g., optical fibers. In one example, an optical fiber segment is disposed between the hub and the closest end station on a given link, the optical fiber being connected by an optical network unit to the remainder of the link which is coaxial cable.

In the star-based topology of FIG. 2, the destination of all data transmitted by the end stations is the central hub 22. Data transmissions from the hub 22 to the end stations are deemed to be in the downstream or forward direction, and data transmissions from the end stations to the hub are deemed to be in the upstream or the reverse direction. All transmissions in the downstream direction take place on a first frequency channel, and all transmissions in the upstream direction take place on a second frequency channel different from the first frequency channel.

In this embodiment, transmission in the downstream direction is simple since the hub 22 is the only transmitter on the first frequency channel. For example, the hub periodically and continuously sends synchronization pulses downstream to the end stations on the first frequency channel. The end stations reference the timing of their data transmissions to these synchronization pulses. Since the hub is the only downstream transmitter on the first frequency channel, the hub can transmit these synchronization pulses to the end stations without collisions.

Data transmissions by multiple end stations in the upstream direction via the second frequency channel on the other hand are subject to data collisions. The network access control protocol of the present invention ensures fair access for each of these end stations while preventing data collisions and/or maximizing bandwidth utilization within the second frequency channel.

The protocol of the present invention assumes that data transmissions from the end stations are substantially unidirectional towards the hub. This assumption would be valid in fiber optic networks where individual fibers are typically used for unidirectional transmission. For networks based on coaxial cables, however, unidirectional transmission can be approximated when the coaxial cables have bidirectional line amplifiers that operate on different frequency bands for the two directions of transmission. Such a bidirectional line amplifier would amplify signals only within a first frequency band for downstream transmission, and only within a second frequency band (different from the first frequency band) for upstream transmission.

Figure 3:
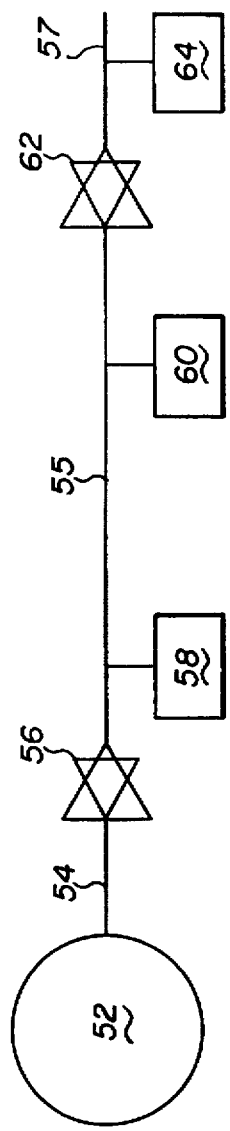
FIG. 3 is a schematic diagram illustrating one link in the star-based communications network of FIG. 2.

As illustrated in FIG. 3, first and second end stations 58 and 60 are operatively connected between two bidirectional line amplifiers 56 and 62 on a coaxial cable portion 55, of the overall link 54 to hub 52. A third end station 64 is operatively connected to a second coaxial cable portion 57, downstream of the line amplifier 62. Hub 52 is operatively connected upstream from the line amplifier 56. In FIG. 3, assume for example that first end station 58 transmits data at a given frequency. The data transmitted by first end station 58 reaches the downstream side of amplifier 56, the upstream side of amplifier 62, and second end station 60. Amplifiers 56 and 62 amplify the data signal only upstream toward the hub 52 for signals of the given frequency. Thus, when the data reaches the downstream side of amplifier 56, the attenuated data signal would be amplified by amplifier 56 and transmitted upstream toward the hub. However, when the data reaches the upstream side of amplifier 62, the data signal would be attenuated in the downstream direction (toward third end station 64), since amplifiers 56 and 62 amplify data signals of the given frequency only upstream toward the hub and block all other frequencies. Thus, end stations (such as 64) downstream of amplifier 62 would effectively not sense the data transmitted by end station 58. As a result, if the distance between such amplifiers is small compared to the span of the whole link 54, data transmission from the end stations can thus be approximated as unidirectional towards the hub.

Figure 4:
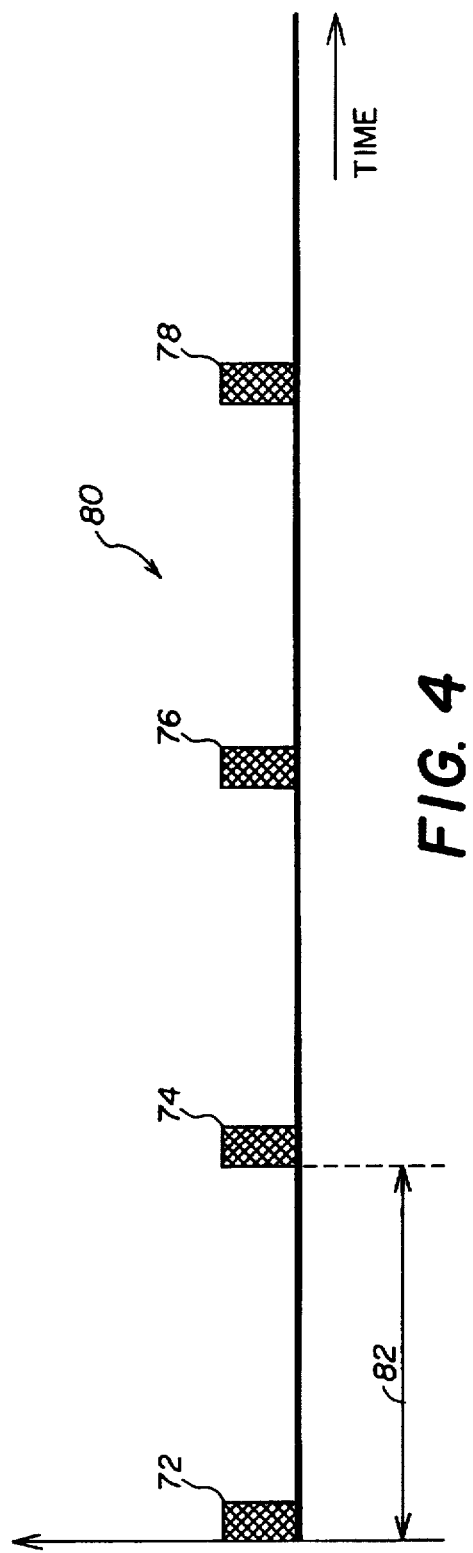
FIG. 4 is an illustration of synchronization pulses generated at the hub of the communications network of FIG. 2.

Assuming such approximately unidirectional data transmission from the end stations toward the hub, the protocol of the present invention uses dynamically assigned time slots (DATS) and implicit ranging (IR) for access control. The timing of data transmissions from the end stations is in reference to synchronization pulses generated periodically and continuously at the central hub. FIG. 4 illustrates a synchronization signal 80—a unique periodic pattern having a representative time period 82. A synchronization pulse 72, 74, 76, 78 . . . (marked with cross hatches) marks the beginning of the period.

The synchronization signal (which is the periodic transmission of the synchronization pulses) is transmitted downstream from the hub and carries a common timing reference to the end stations. The end stations time their data transmission in reference to this common signal.

Figure 5A:
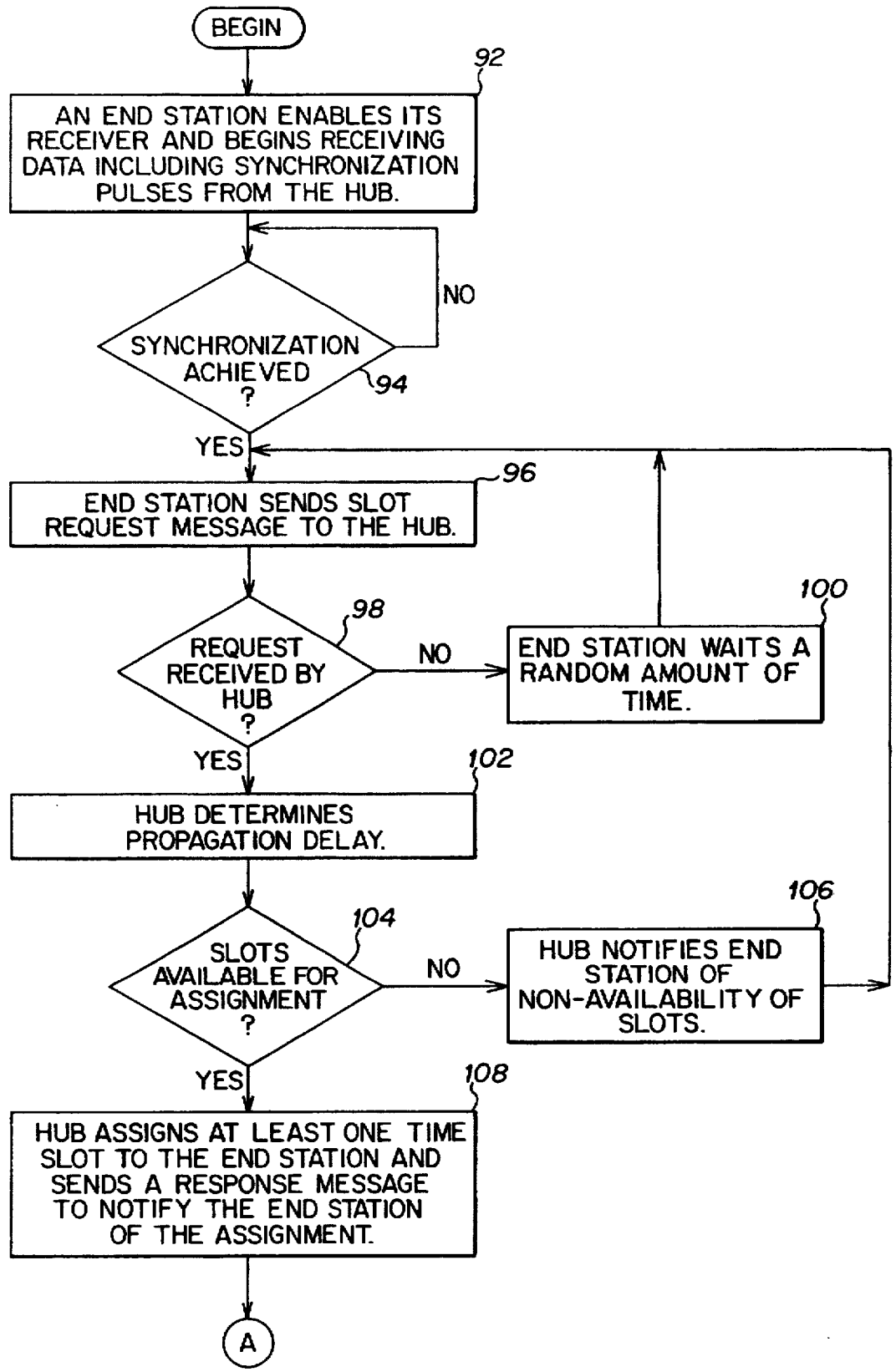
FIG. 5A is a flowchart of an initialization phase of the access control protocol according to the present invention.
Figure 5B:
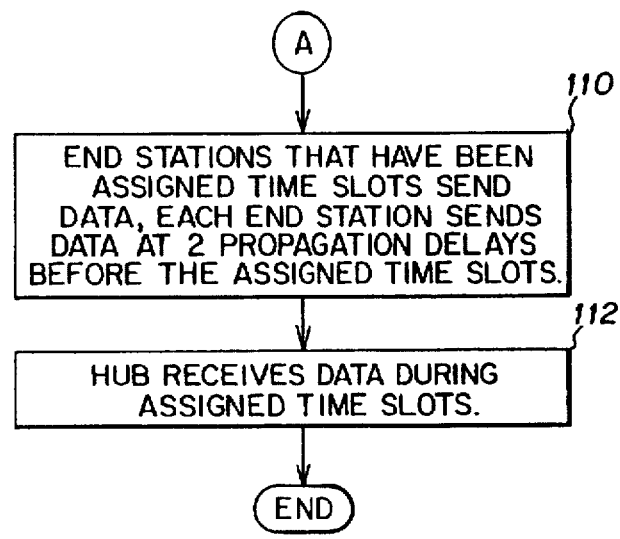
FIG. 5B is a flowchart of a transmission phase of the access control protocol according to the present invention.

The flow charts of FIGS. 5A–5B provide an overview of the steps performed in the protocol when an end station wishes to transmit data to the hub. FIG. 5A shows the steps performed during an initialization phase of the DATS/IR protocol, and FIG. 5B shows the steps performed during a transmission phase.

Referring to the flowchart of FIG. 5A, the DATS/IR protocol begins the initialization phase when an end station, operatively connected to a link common to multiple end stations and wishing to send data, enables its receiver and begins receiving synchronization pulses from the hub in step 92. Synchronization between the end station and the hub must be achieved in step 94 before the initialization phase can continue.

Once synchronization is achieved, the end station sends a slot request message to the hub in step 96. The slot request message is sent between synchronization pulses and at a specified time duration from a synchronization pulse. This time duration may be prespecified for the end station in which case, the respective time duration would be known, a priori, by the hub and all end stations. Alternatively, the end station may indicate the position of this time duration relative to the synchronization pulse by including this information in the slot request message.

Assuming the slot request message reaches the hub, the hub will respond to the end station indicating that the hub has received the slot request message. Since more than one end station may send a slot request message at the same time, these request messages may collide with each other before reaching the hub. If the end station detects no response from the hub after the end station waits a predetermined time, the end station waits a random time (in step 100) and resends the slot request message. The wait for a random time minimizes the probability of a collision.

Upon receiving the slot request message from an end station, the hub must determine the propagation delay for that end station in step 102. The hub may have a table for keeping a record of such propagation delays, and in that case, the hub can look in the table for the propagation delay corresponding to each end station.

Figure 6:
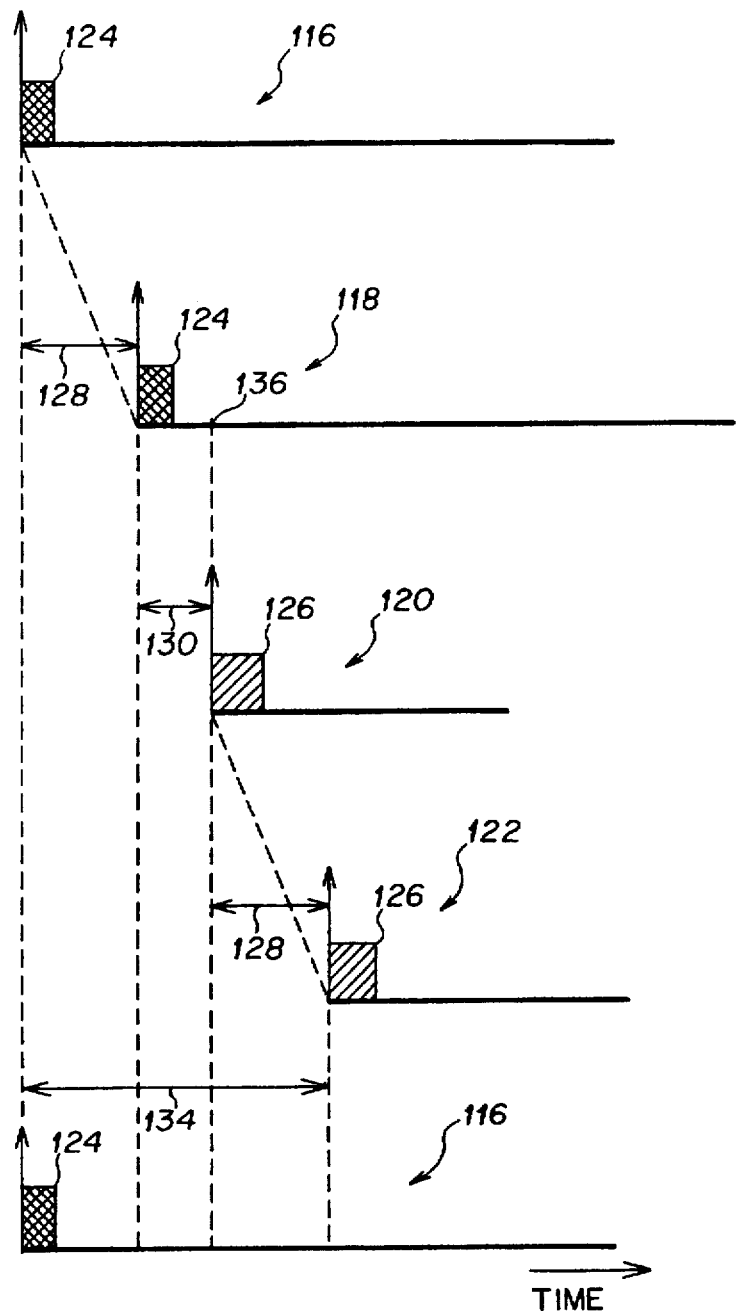
FIG. 6 is a timing diagram illustrating an implicit ranging method for determining the propagation delay between an end station and the hub.

If no entry is found in such a table or if no table exists, the hub determines the propagation delay from the arrival of the slot request message. FIG. 6 shows a timing diagram which illustrates how the hub determines this propagation delay using an implicit ranging method. Signal 116 is a synchronization signal at the hub. The hub has a clock and sends a synchronization pulse 124 (having a reference time determined by the hub clock) to the end station for which the propagation delay is being measured. The synchronization pulse 124, in traveling from the hub to the end station, reaches the end station with a shift or propagation delay 128; this results in a second timing signal 118, i.e., a shifted synchronization signal at the end station. The end station has a timer which it restarts when it receives the synchronization pulse 124 (in second timing signal 118). A signal 120 with a slot request message 126 is then sent by the end station at a time 136, which is a time duration 130 after the start of the second timing signal 118. The time duration 130 can be predefined and thus known a priori by the hub and the end stations. In the alternative, the end station can determine the time duration, and can notify the hub of this time duration by including such information in the slot request message. In either case, the end station uses its timer to send the slot request message at time point 136, and the hub knows of the time duration 130.

The slot request message 120 reaches the hub as signal 122 with a shift of another propagation delay 128 for a total delay of time duration 134 from the beginning of the synchronization signal 116 at the hub. The total shift 134 can be determined by the hub since the hub now has access to both signals 116 and 122. This total shift is comprised of the two propagation delays 128, and the finite time duration 130. With time duration 130 already known to the hub, the propagation delay can be calculated as follows:

Propagation Delay=(Time Duration 134−Time Duration 130)/2.

The ranging method illustrated in FIG. 6 is "implicit" because no explicit signal is necessary for a determination of the propagation delay. Rather, the slot request message is used both for notifying the hub that the end station wishes to transmit data and for the determination of the propagation delay. Alternatively, one of the hub and end station can send a signal to the other which is reflected back, and the measured delay can be used to determine the propagation delay.

Referring back to the flowchart of FIG. 5A, when the propagation delay for an end station wishing to send data has been determined (step 102), a time slot can be assigned to the end station (step 108). A time slot is a finite duration of time assigned between two consecutive synchronization pulses as illustrated in the synchronization signal 138 of FIG. 7. Time duration 140 is a representative period of the synchronization signal 138, where synchronization pulse 144 (generated by the hub) marks the beginning of the period. Time duration 142 is a representative time slot assigned within the representative period; each time slot has an active time slot 146 and a guard band 148. The requirement of the guard band within each time slot is explained in greater detail below with respect to the transmission phase of the DATS/IR protocol.

Figure 7:
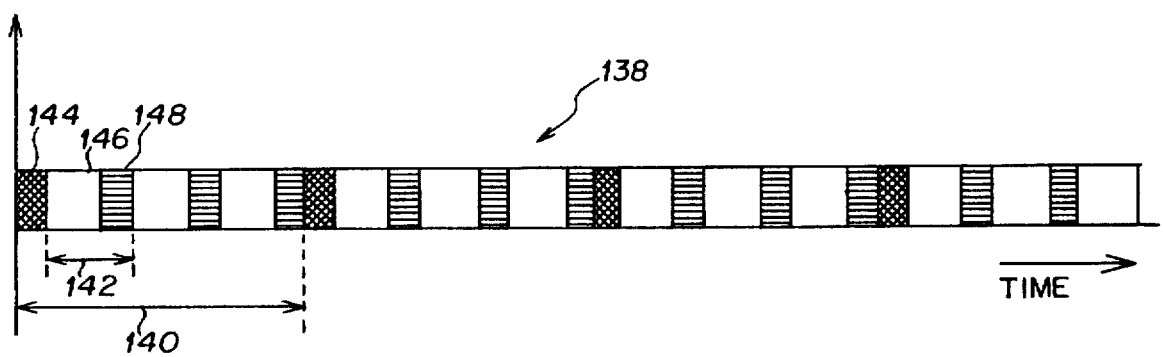
FIG. 7 is a timing diagram illustrating synchronization pulses and the assignment of time slots between the synchronization pulses.

The representative period 140 in FIG. 7 has a total of three assigned time slots for convenience of illustration. However, the number of time slots assigned in a period of the synchronization signal may vary over time and in general should be at least the total number of end stations operatively connected to a link.

Referring back to FIG. 5A, if no time slots are available for assignment, the end station is notified of the nonavailability (step 106). In that case, the notified end station can resend the slot request message (the protocol goes back to step 96). If time slots are available for assignment, the DATS/IR protocol assigns a time slot to the end station wishing to send data. One time slot or a plurality of consecutive time slots can be assigned to an end station; the number of assigned time slots may depend on the amount of data that the end station wishes to send. The number of time slots available in each period of the synchronization signal should be at least the number of end stations operatively connected to a link, or at least the number of end stations that can be foreseen to be operatively connected to the link, so that each end station is assigned at least one slot.

Just as time slots can be assigned for newly added end stations, older time slot assignments can be terminated. If an end station has not sent any data during its assigned time slot for a certain time, or at the end station's request, or if the end station is disconnected from the network, the assigned time slot(s) can be terminated. For example, when an end station has no data to send, it may send a message to the hub to relinquish its assignment. This termination procedure may allow for more efficient utilization of the time slots.

Assignment of time slots to end stations wishing to send data to the hub marks the end of the initialization phase. The initialization phase has been completed during a prespecified time duration between the synchronization pulses and before the end stations transmit data. The assignment of time slots to end stations is not required to depend on the distance of the end stations to the hub, and the hub can assign any time slot(s) sufficient to meet the bandwidth requirements of an end station. Thus, the assignment of time slot(s) to each end station is independent of the assignment for all other end stations.

With time slots assigned to end stations, the DATS/IR protocol now enters a transmission phase. An overview of this phase is shown in the flowchart of FIG. 5B. Each end station wishing to send data to the hub may start to send its data at a predetermined time point such that its data arrives at the hub during its assigned time slot(s). Each end station may send its data for the duration of its assigned time slot(s) at every period of the synchronization signal until the hub terminates the assignment.

Figure 8:
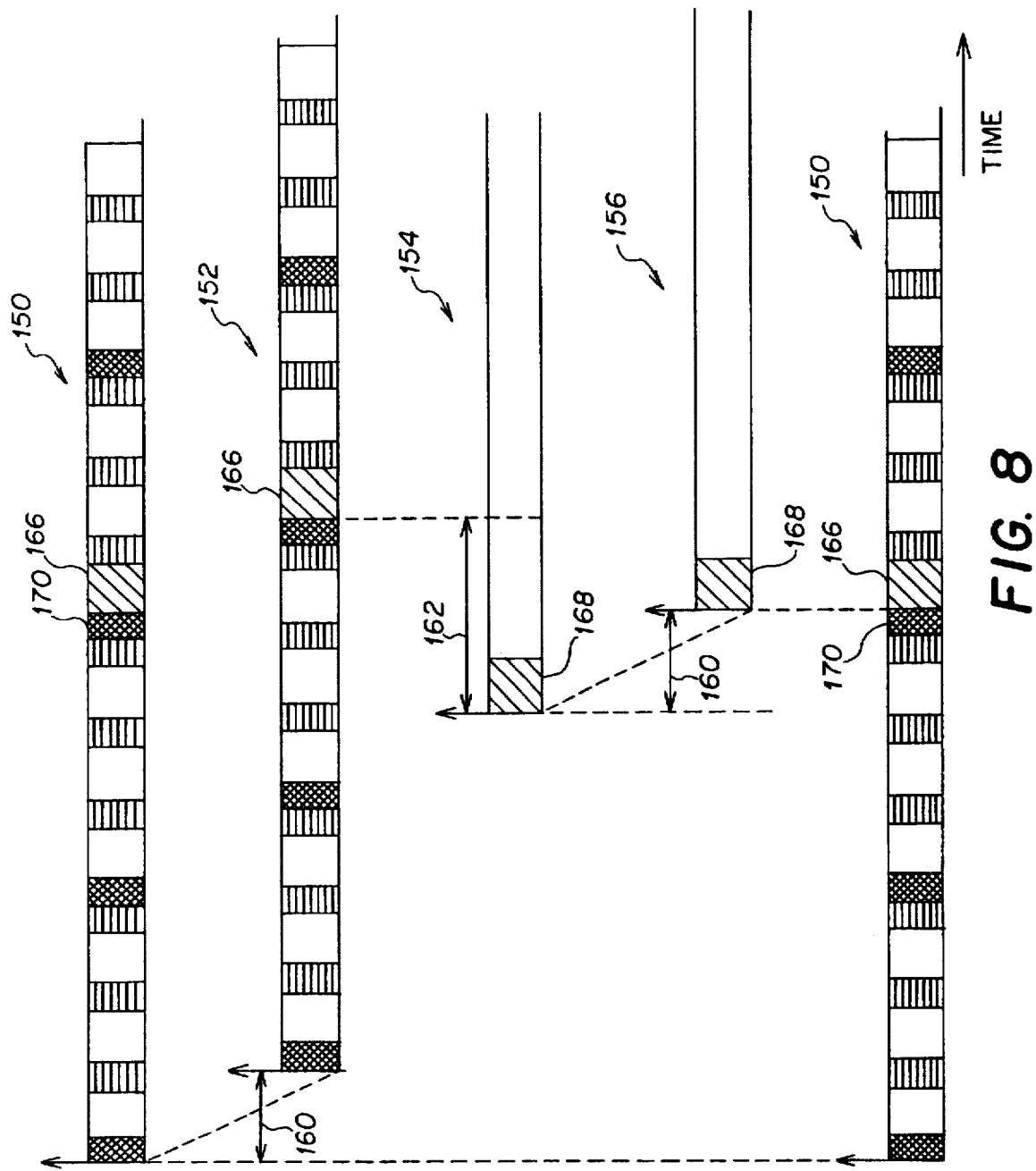
FIG. 8 is a timing diagram for data transmission from a first end station to the hub with data arriving at the hub during a first time slot.

Referring to FIGS. 3 and 8 for example, assume that end station 58 wishes to send data and that slot 166, which is the first time slot from a synchronization pulse 170 in a synchronization signal 150, has been assigned to this end station during the initialization phase. The transmission phase begins when the hub sends to end station 58 the synchronization pulses (marked with cross hatches) within the signal 150, and notifies this end station of its assigned time slot and propagation delay. Note that these notification signals and the synchronization signal are sent downstream from the hub to end station 58 via a channel separate from the channel for upstream data transmission.

The synchronization pulses would have shifted by a time duration 160 upon reaching end station 58 to provide a shifted timing signal 152 to end station 58, where time duration 160 is the measured propagation delay that the hub has previously determined. (Shifted timing signal 152 also illustrates the assigned time slots between the synchronization pulses.) End station 58 then times its data transmission in reference to the shifted synchronization pulses in timing signal 152.

In order for the data sent by end station 58 to reach the hub during its assigned time slot 166 in the hub's synchronization signal 150, end station 58 must start to send its data 168 at the beginning of a time duration 162 that is twice the propagation delay before the beginning of the time slot 166 in the shifted timing signal 152. After this starting point, end station 58 may send its data for a duration of its assigned time slot. A data signal 154 sent by end station 58 will arrive at the hub as a received data signal 156, again shifted by the propagation delay 160. As shown in FIG. 8, the data 168 then arrives during the assigned slot 166 of the hub's synchronization signal 150.

The data 168 is sent from the end station 58 at the start of a time duration 162 that is twice the measured propagation delay before the beginning of assigned time slot 166 in the shifted timing signal 152. The two propagation delays ensure arrival of the data 168 during the assigned slot 166 in the hub's synchronization signal 150 since one propagation delay accounts for the shift of the timing signal 152 (at end station 58) and since the other propagation delay accounts for the time duration necessary for data 168 to propagate to the hub.

Figure 9:
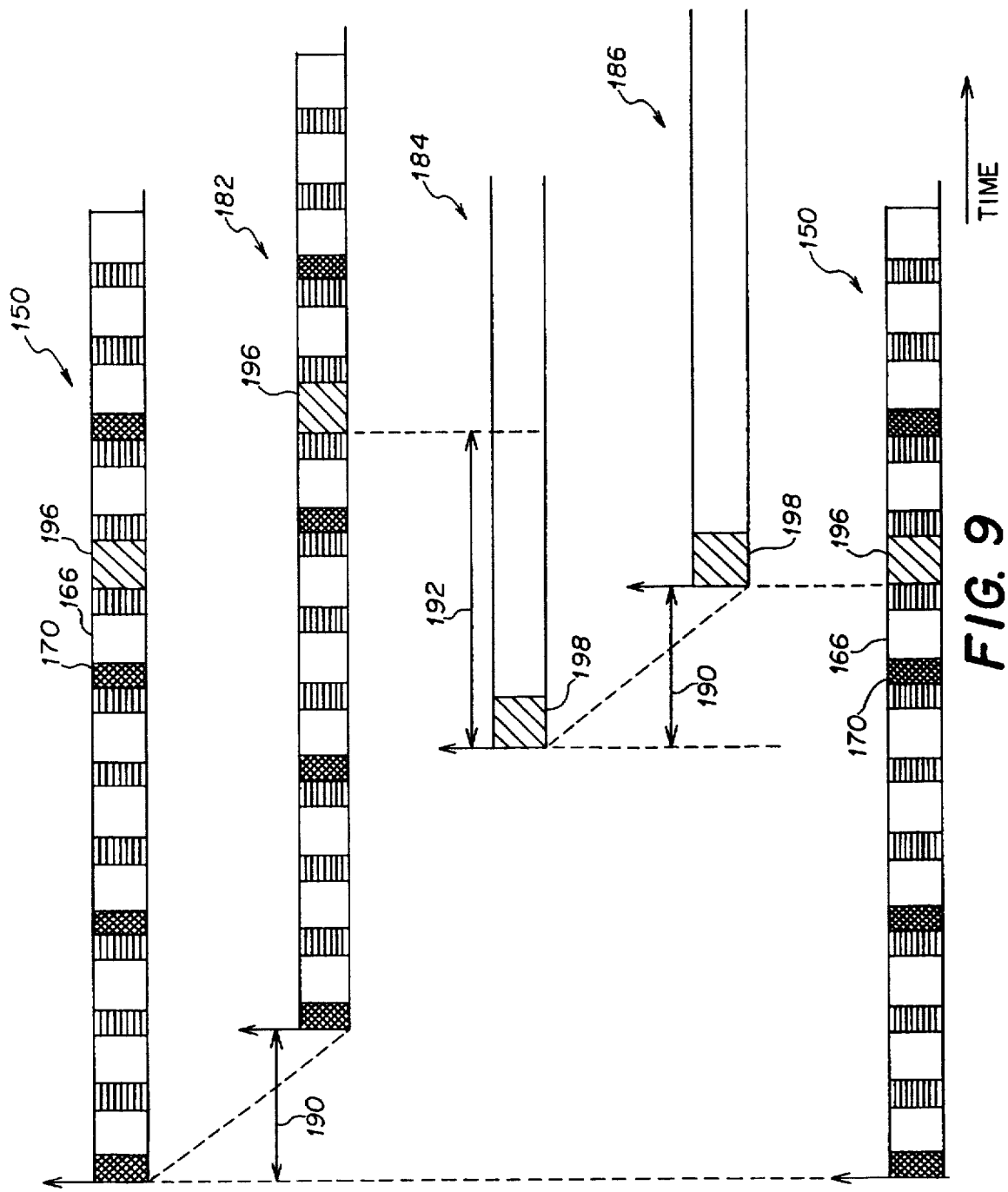
FIG. 9 is a timing diagram for data transmission from a second end station to the hub with data arriving at the hub during a second time slot.

Referring to FIGS. 3 and 9 for an example of pipe-lined transmission, assume that end station 64, in addition to end station 58, wishes to transmit data to the hub. End station 64 is further away from the hub than end station 58 and thus has a larger propagation delay. Assume that a slot 196 (see FIG. 9), that is latter from the slot 166, has been assigned to end station 64 during the initialization phase. Here, slot 166 assigned to end station 58 is the first time slot from the synchronization pulse 170, and slot 196 assigned to end station 64 is the second time slot from the synchronization pulse.

In the transmission phase, the hub sends to end station 64 the synchronization signal 150 and notifies end station 64 of the assigned time slot and the measured propagation delay that the hub has determined for this end station (on a channel for downstream transmission that is separate from the channel for upstream data transmission). The synchronization pulses would have shifted by a time duration 190 from the hub's synchronization signal 150 upon reaching end station 64 to provide a shifted timing signal 182. The time duration 190 is also the measured propagation delay that the hub has determined for end station 64.

End station 64 times its data transmission in reference to the shifted timing signal 182. In order for the data sent by end station 64 to reach the hub during its assigned time slot 196 in the hub's synchronization signal 150, end station 64 must start to send its data at the beginning of a time duration 192 that is twice the measured propagation delay before the beginning of the assigned time slot 196 in the shifted timing signal 182. After this starting point, end station 64 may transmit its data for the duration of its assigned time slot.

A data signal 184 sent by end station 64 will arrive at the hub as a received data signal 186. The received data signal 186 has been shifted by time duration 190 which is the measured propagation delay. As shown in FIG. 9, the data 198 then arrives at the hub within the assigned slot 196, which is the second time slot from the synchronization pulse 170. The data sent by end station 58 has already arrived within the first time slot 166. The data from the two end stations 58 and 64 has thus been transmitted through the network in a pipe-lined manner.

The duration of a time slot in the synchronization signal depends on the available bandwidth of the link, the amount of data each station may wish to send on the link, and the number of end stations the hub may service. In order to prevent collisions and to preserve data, the duration of a time slot is sufficiently long for a maximum data length requirement, or a sufficient number of time slots is assigned to an end station. In the case of a plurality of consecutive time slots being assigned to an end station, the end station would start to send its data at the beginning of a time duration that is twice the end station's measured propagation delay before the beginning of the plurality of consecutive time slots. After this starting point, the end station transmits its data for a duration of its assigned plurality of time slots.

With data from end stations traveling through the link in a pipe-lined manner, the bandwidth utilization can be maximized for long distance communications networks since longer links can carry more data. Moreover, data transmission in the pipe-lined manner with the DATS/IR protocol prevents collisions as can be shown with a mathematical proof.

For the mathematical proof, refer to the example of end stations 58 and 64 wishing to transmit data to the hub and to FIGS. 3, 7, and 8. Since end station 58 is disposed closer to the hub than end station 64, assume end stations 58 and 64 have respective propagation delays $t_{58}$ and $t_{64}$ where $t_{64} > t_{58}$. For generality, assume that the $m^{th}$ time slot from the synchronization pulse is assigned to end station 58 and the $n^{th}$ time slot from the synchronization pulse is assigned to end station 64. Also, assume that the time point of reference for the beginning of the synchronization signal at the hub is $T_h$, that each time slot has duration S, that the duration of a synchronization pulse is negligible, and that data transmissions from end stations 58 and 64 are substantially unidirectional toward the hub. Then the following would hold:

Start of $m^{th}$ time slot in the shifted timing signal at end station 58:

$$=T_h+t_{58}+(m-1)S$$

Start of transmission at end station 58:

$$=T_h+t_{58}+(m-1)S-2t_{58}$$

$$=T_h+(m-1)S-t_{58}$$

Thus, end station 58's data arrives at the hub at time point:

$$=T_h+(m-1)S-t_{58}+t_{58}$$

$$=T_h+(m-1)S,$$

which is the beginning of the assigned time slot in the hub's synchronization signal.

Similarly for end station 64:

Start of $n^{th}$ time slot in the shifted timing signal at end station 64:

$$=T_h+t_{64}+(n-1)S$$

Start of transmission at end station 64:

$$=T_h+t_{64}+(n-1)S-2t_{64}$$

$$=T_h+(n-1)S-t_{64}$$

Thus, end station 64's data arrives at the hub at time point:

$$=T_h+(n-1)S-t_{64}+t_{64}$$

$$=T_h+(n-1)S,$$

which is the beginning of the assigned time slot in the hub's synchronization signal.

The following proof verifies the prevention of collisions:
Time point of end of transmission at end station 58:

$$=T_h+(m-1)S-t_{58}+S$$

$$=T_h+mS-t_{58}$$

Propagation delay in data transmitted by end station 64 reaching end station 58:

$$=t_{64}-t_{58}$$

Arrival time of end station 64's data at end station 58

$$=\text{start of transmission at end station }64+(t_{64}-t_{58})$$

$$=T_h+(n-1)S-t_{64}+t_{64}-t_{58}$$

$$=T_h+(n-1)S-t_{58}$$

If n>m, the arrival time of the beginning of end station 64's data at end station 58, $T_h+(n-1)S-t_{58}$, is always after the end of data transmission at end station 58, $T_h+mS-t_{58}$. Thus, no collision would occur when data is transmitted through the link in a pipe-lined manner. This case is illustrated in the example of the pipe-lined transmission in FIG. 9.

Alternatively, if n<m, then end station 54 would be assigned a time slot after the time slot assigned to end station 64. In that case, the arrival time of the end of end station 64's data is always before the beginning of data transmission by end station 58, thus ensuring no collision. This condition can be shown by the following equations:

Arrival time of the end of end station 64's data at end station 58

$$=T_h+(n-1)S-t_{58}+S$$

$$=T_h+nS-t_{58}$$

Start of transmission at end station 58:

$$=T_h+(m-1)S-t_{58}$$

For n<m, the arrival time of the end of end station 64's data at end station 58 ($T_h+nS-t_{58}$) would be less than the start of transmission at end station 58 ($T_h+(m-1)S-t_{58}$), unless n=m−1.

In the case of n<m and n=m−1, the arrival time of the end of end station 64's data at end station 58 ($T_h+nS-t_{58}$) would be equal to the start of transmission at end station 58 ($T_h+(m-1)S-t_{58}$). However, a guard band inserted between each consecutive time slots still ensures no collision since no end station can transmit data during a guard band.

Figure 10:
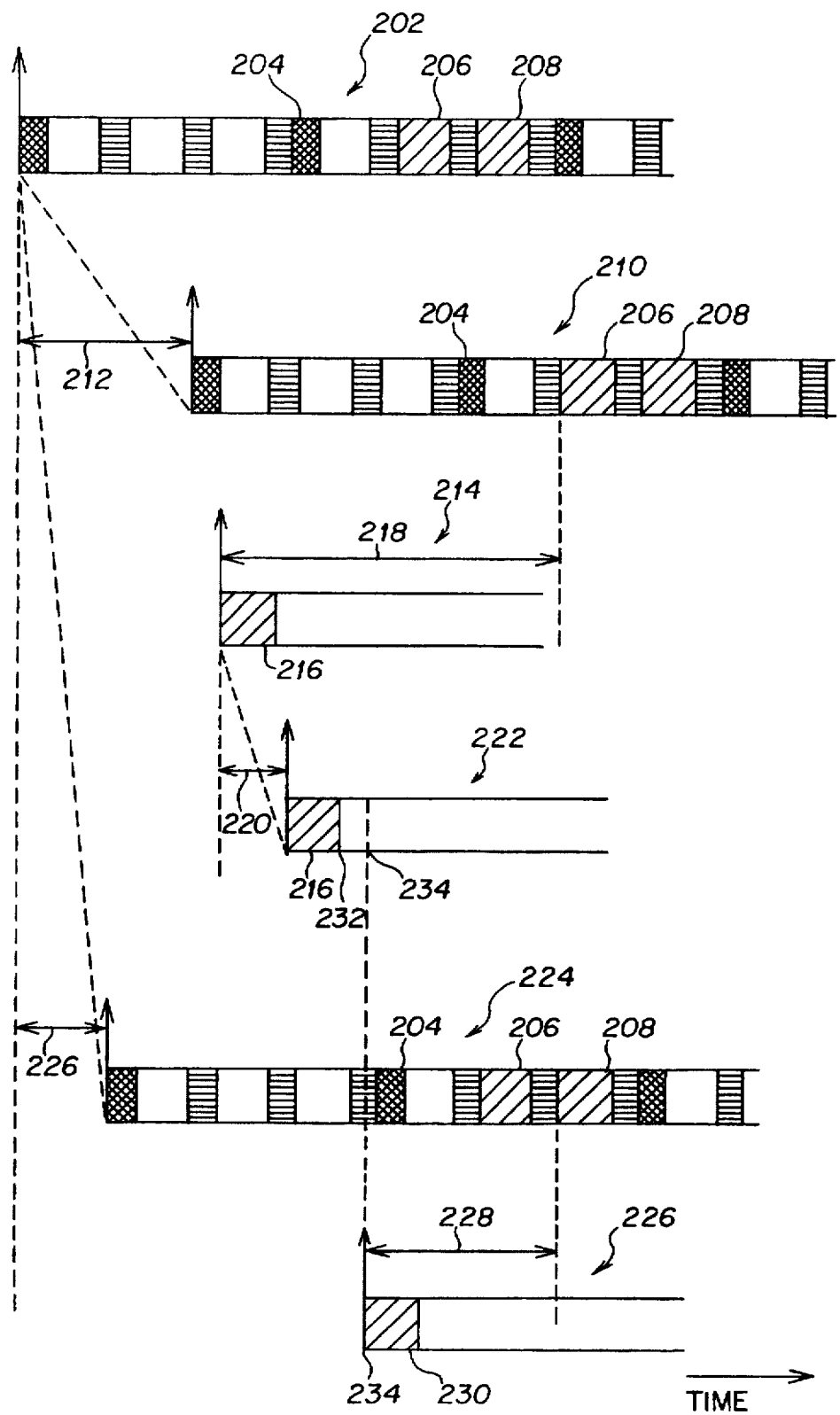
FIG. 10 is a timing diagram for data transmission with a third time slot assigned to the first end station of FIG. 8 and with the second time slot assigned to the second end station of FIG. 9.

FIG. 10 illustrates the worst case scenario where n<m and n=m−1. Timing diagram 202 shows the synchronization signal at the hub with time slots assigned between the synchronization pulses. Assume that the second time slot 206 and the third time slot 208 from the synchronization pulse 204 have been assigned to end stations 64 and 58, respectively. Thus, end station 58 which is disposed closer to the hub than end station 64 has been assigned a later time slot from that assigned to end station 64. Recall also that because of these relative locations from the hub, end station 58 has a lower propagation delay than end station 64 (i.e., $t_{64} > t_{58}$).

The hub sends periodic synchronization pulses to end station 64, and the synchronization pulses would have shifted by a time duration 212 upon reaching end station 64 to provide a first shifted timing signal 210 to end station 64. Time duration 212 is the measured propagation delay $t_{64}$. (Shifted timing signal 210 also illustrates the assigned time slots between the synchronization pulses.) End station 64 then times its data transmission in reference to the shifted synchronization pulses in the first timing signal 210.

In order for the data sent by end station 64 to reach the hub during its assigned time slot 206 in the hub's synchronization signal 202, end station 64 starts to send its data 216 at the beginning of a time duration 218 that is twice the propagation delay $t_{64}$ before the beginning of the time slot 206 in the first timing signal 210. After this starting point, end station 64 may send its data for a duration of its assigned time slot.

The data signal 214 sent upstream to the hub by end station 64 will arrive at end station 58 as the shifted data signal 222. The shifted data signal 222 at end station 58 will be delayed from the data signal 214 by a time duration 220 which is equal to $t_{64}-t_{58}$. Time point 232 marks the end of the data in the data signal 222 at end station 58.

The hub sends periodic synchronization pulses to end station 58, and the synchronization pulses would have shifted by time duration 226 upon reaching end station 58 to provide a second shifted timing signal 224 to end station 58. Time duration 226 is the measured propagation delay $t_{58}$. End station 58 then times its data transmission in reference to the shifted synchronization pulses in the second timing signal 224.

In order for the data sent by end station 58 to reach the hub during its assigned time slot 208 in the hub's synchronization signal 202, end station 58 must start to send its data 230 at the beginning 234 of a time duration 228 that is twice the propagation delay $t_{58}$ before the beginning of time slot 208 in the second timing signal 224. After this starting point, end station 58 may send its data for a duration of its assigned time slot.

Comparing the data signal 222 that arrives at end station 58 from end station 64 with the data signal 226 that end station 58 transmits, FIG. 10 illustrates that the end point 232 of data 216 occurs before the beginning point 234 of data 230. The two points are separated by a duration of a guard band. Thus, no collision would occur at end station 58 since data transmitted upstream from end station 64 will have already passed end station 58 when end station 58 begins to transmit its data. Thus, no collision has occurred for the case where $t_{64} > t_{58}$ (i.e., where end station 58 is disposed nearer to the hub than end station 64), and where n<m.

Thus as long as the propagation delay is determined for each end station wishing to transmit data, and the end stations begin to transmit data at a beginning of a time period that is twice its respective propagation delay before its respective assigned time slot(s), no collision would occur irrespective of which time slots are assigned to the end stations. Thus, assignment of time slots to an end station is independent of the assignment to other end stations.

Also, guard bands are included in every time slot to prevent collisions when sublinks of the communications networks are bidirectional, e.g., coaxial cable link 55 in FIG. 3. In the synchronization signal 138 of FIG. 7, a guard band 148 in the representative time slot 142 is shown with horizontal line markings. Referring to the coaxial cable link 55 of FIG. 3, guard bands are necessary because data from an end station can be transmitted in both directions between any two consecutive line amplifiers. In FIG. 3 for example, when end station 58 transmits, its data travels in the downstream direction to the upstream side of amplifier 62, in addition to traveling toward the hub.

If end station 60 were to transmit its data, before data from end station 58 reaches end station 60, a collision would result. In order to prevent collision of data between any two consecutive line amplifiers, a guard band is included in every time slot. (Note that theoretically, guard bands would not be necessary in communications media such as optical fibers that can support purely unidirectional transmissions. In practice however, small guard bands may still be necessary in optical fibers to account for inaccuracies in the system.) No end station can transmit data during a guard band. A collision occurring between any two consecutive line amplifiers can be prevented if the duration of the guard band is at least the end-to-end propagation delay of the largest coaxial cable sublink between any two consecutive amplifiers on the link.

With this constraint, data sent by an end station between any two consecutive amplifiers would have reached the two consecutive amplifiers before another end station between these amplifiers begins its data transmission, thus ensuring no collision of data sent by two end stations between the two consecutive amplifiers. With guard bands included in every time slot and with the DATS/IR protocol sending data through long distance links in a pipe-lined manner, data collisions can be prevented. Moreover, bandwidth utilization is maximized since more data can be carried by a longer link.

Having thus described various embodiments of the present invention, modifications and improvements will readily occur to those skilled in the art. For example, instead of the hub determining the propagation delay that results when data is traveling from end stations to the hub, any end station can determine these propagation delays. Also, instead of the hub generating the synchronization pulses, an end station can generate the reference timing signal. Moreover, any media in addition to optical fibers, that can support unidirectional data transmission, or any media in addition to coaxial cables, that can support approximately unidirectional data transmission, can be used with the DATS/IR protocol. Assignment of time slots based on distance of the end station from the hub, with the closest end station being assigned the first slot after the synchronization pulse, is an option but not required. Accordingly, the foregoing description is by way of example only and is not intended to be limiting. The invention is limited only as defined in the following claims and equivalents thereto.

What is claimed is:

1. A method of controlling sending of first data to a hub from a first end station operatively connected to a link in a communications network, and for controlling sending of second data to the hub from a second end station operatively connected to the link, the method comprising the steps of:

(A) the hub providing a synchronization signal over the link to the first end station to provide a first timing signal for the first end and to the second end station to provide a second timing signal for the second end station, the synchronization signal having a predetermined period including a synchronization pulse for marking a start of the period and a plurality of time slots assigned to the period in chronological order from the synchronization pulse;

(B) the first end station sending a first slot request message to the hub at a first time duration from a start of the first timing signal, and the second end station sending a second slot request message to the hub at a second time duration from a start of the second timing signal:

(C) the hub assigning a first time slot having a first time slot duration to the first end station in response to the first slot request message and a second time slot having a second time slot duration to the second end station in response to the second slot request message;

(D) the hub notifying the first end station of its assignment to the first time slot, and notifying the second end station of its assignment to the second time slot.

2. The method of claim 1, further comprising the steps of:
(E) the hub determining a first propagation delay for sending the first data from the first end station to the hub and a second propagation delay for sending the second data from the second end station to the hub, and
(F) the hub notifying the first end station of the first propagation delay and the second end station of the second propagation delay.

3. The method of claim 2, wherein the first timing signal is the synchronization signal delayed by the first propagation delay, the second timing signal is the synchronization signal delayed by the second propagation delay, and the method further comprises the steps of:
(G) the first end station initializing transmission to the hub of the first data at a first point in time that is twice the first propagation delay prior to the first time slot in the first timing signal, and the second end station initiating transmission to the hub of the second data at a second point in time that is twice the second propagation delay prior to the second time slot in the second timing signal; and
(H) the first end station sending the first data for at most the first time slot duration, and the second end station sending the second data for at most the second time slot duration.

4. The method of claim 3, further comprising the step of:
(I). the hub receiving the first data during the first time slot in the synchronization signal and the second data during the second time slot in the synchronization signal.

5. The method of claim 4, further comprising the steps of:
(J) the hub rejecting a slot request message from at least one of the first and second end stations when all time slots in the synchronization signal have been assigned;
(K) the at least one rejected end station resending the slot request message to the hub; and
(L) repeating steps J and K until at least one time slot in the synchronization signal is assigned to the at least one rejected end station.

6. The method of claim 1, further comprising the steps of:
(M) least one of the first and second end stations timing an elapsed time since sending a slot request message;
(N) when the elapsed time exceeds a predetermined time duration before the at least one end station receives a response from the hub, the at least one end station resending the slot request message after waiting a random time period; and
(O) repeating steps M and N until the at least one end station receives the response from the hub within the predetermined time duration.

7. The method of claim 2, wherein the first propagation delay is determined from arrival of the first slot request message at the hub and the first time duration, and the second propagation delay is determined from arrival of the second slot request message at the hub and the second time duration.

8. The method of claim 1, wherein two amplifiers are coupled to the link and wherein step B includes the steps of:
determining a respective delay that would result when data travels between the two amplifiers; and
providing a guard band in each time slot, the guard band having a time duration that is a longest respective propagation delay between the two amplifiers.

9. The method as recited in claim 1, wherein
the synchronization signal is sent from the hub to the first and second end stations on a first frequency channel in the link; and
the first and second slot request messages are sent on a second frequency channel in the link different from the first frequency channel.

10. A network access manager that controls sending of first data to a hub from a first end station operatively connected to a link in a communications network, and that controls sending of second data to the hub from a second end station operatively connected to the link, the network access manager comprising:
a signal generator, operatively connected to the hub, that generates a synchronization signal having a predetermined period over the link from the hub to the first and second end stations, each period including a synchronization pulse for marking a start of each period and a plurality of time slots being assigned to the period in chronological order from the synchronization pulse;
a slot request message sender, operatively connected to the first end station and the second end station, that sends a first slot request message, at a first time duration from a start of the synchronization signal, to the hub to receive the first data, and that sends a second slot request message, at a second time duration from a start of the synchronization signal, to the hub to receive the second data; and
an assignment circuit, operatively connected to the hub, that assigns a first time slot, having a first time slot duration, to the first end station in response to the first slot request message and a second time slot, having a second time slot duration, to the second end station in response to the second slot request message.

11. The network access manager of claim 10, further comprising:
a timing circuit, operatively connected to the hub, the first end station, and the second end station, that determines a first propagation delay for sending the first data from the first end station to the hub and a second propagation delay for sending the second data from the second end station to the hub; and
a notification circuit, operatively connected to the timing circuit, the first end station, and the second end station, that informs the first end station of its assignment to the first time slot and of the first propagation delay, and the second end station of its assignment to the second time slot and of the second propagation delay.

12. The network access manager of claim 11 wherein, the signal generator sends the synchronization signal to the first end station to provide a first timing signal to the first end station that is the synchronization signal delayed by the first propagation delay, and to the second end station to provide a second timing signal to the second end station that is the synchronization signal delayed by the second propagation delay and wherein, the network access manager further comprises:
a data sending circuit, operatively connected to the first end station and the second end station, that initiates transmission of the first data at a first point in time that is twice the first propagation delay prior to the first time slot in the first timing signal and that sends the first data for at most the first time slot duration, and initiates transmission of the second data at a second point in time that is twice the second propagation delay prior to the second time slot in the second timing signal and that sends the second data for at most the second time slot duration.

13. The network access manager of claim 11 wherein, the timing circuit determines the first propagation delay responsive to the arrival of the first slot request message at the hub and the first time duration, and the second propagation delay responsive to the arrival of the second slot request message at the hub and the second time duration.

14. The network access manager of claim 10 wherein, the hub rejects a slot request message from one of the first and second end stations when all time slots in the synchronization signal have been assigned to end stations.

15. The network access manager of claim 10 wherein, at least one of the first and second end stations resends a slot request message when a response from the hub is not detected within a predetermined time duration after sending a respective slot request message.

16. The network access manager as recited in claim 10, wherein the synchronization signal is sent to the first and second end stations on a first frequency channel in the link; and the first and second slot request messages are sent on a second frequency channel in the link different from the first frequency channel.

17. A communications network comprising:

a link to provide a communications medium among end stations operatively connected to the link;

a hub, operatively connected to the link, to receive and route data from and to the end stations;

a first end station, operatively connected to the link, to send first data to the hub;

a second end station, operatively connected to the link, to send second data to the hub;

a signal generator to generate a synchronization signal having a predetermined period, each period including a synchronization pulse for marking a start of each period and a plurality of time slots assigned to the period in chronological order from the synchronization pulse;

a slot request message sender, operatively connected to the end stations, to send a first slot request message, at a first time duration from a start of the synchronization signal, to the hub to receive the first data, and to send a second slot request message, at a second time duration from the start of the synchronization signal, to the hub to receive the second data; and an assignment circuit, operatively connected to the hub, to assign a first time slot, having a first time slot duration, to the first end station responsive to the first slot request message and to assign a second time slot, having a second time slot duration, to the second end station responsive to the second slot request message.

18. The communications network of claim 17, further comprising:

a timing circuit, operatively connected to the hub, the first end station, and the second end station, to determine a first propagation delay for sending the first data from the first end station to the hub and a second propagation delay for sending the second data from the second end station to the hub; and a notification circuit, operatively connected to the timing circuit, the first end station, and the second end station, to inform the first end station of its assignment to the first time slot and of the first propagation delay, and the second end station of its assignment to the second time slot and of the second propagation delay.

19. The communications network of claim 18 wherein the signal generator sends the synchronization signal to the first end station to provide a first timing signal to the first end station that is the synchronization signal delayed by the first propagation delay, and to the second end station to provide a second timing signal to the second end station that is the synchronization signal delayed by the second propagation delay, and wherein, the communications network further comprises:

a data sending circuit, operatively connected to the first end station and the second end station, to initiate transmission of the first data at a first point in time that is twice the first propagation delay prior to the first time slot in the first timing signal for at most the first time slot duration, and to initiate transmission of the second data at a second point in time that is twice the second propagation delay prior to the second time slot in the second timing signal for at most the second time slot duration.

20. The communications network of claim 18 wherein the first propagation delay is determined by the timing circuit from arrival of the first slot request message at the hub and the first time duration, and the second propagation delay is determined from the arrival of the second slot request message at the hub and the second time duration.

21. The communications network of claim 17 wherein, the hub rejects a slot request message from at least one of the first and second end stations when all time slots in the synchronization signal have been assigned to end stations.

22. The communications network of claim 17 wherein, at least one of the first and second end station resends a slot request message when a response from the hub is not detected within a predetermined time duration after sending a respective slot request message.

23. The network as recited in claim 17, wherein:

the synchronization signal is sent to the first and second end stations on a first frequency channel in the link; and the first and second slot request messages are sent on a second frequency channel in the link different from the first frequency channel.

* * * * *